A. C. TUBBS
RANGE FINDER
APPLICATION FILED FEB. 14, 1917.
1,250,717.
Patented Dec. 18, 1917.
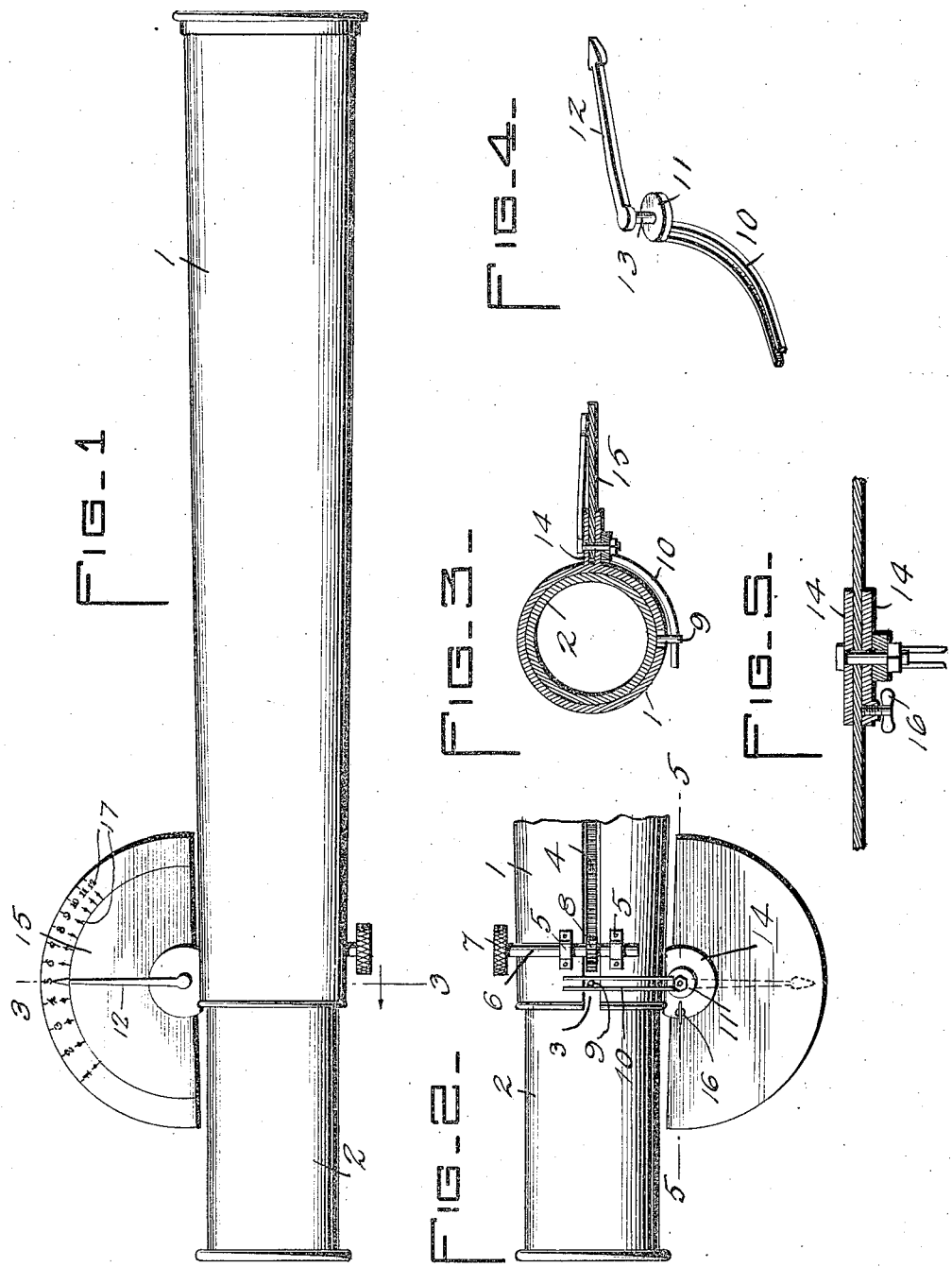
WITNESSES
INVENTOR
AMOS C. TUBBS,
BY
ATTORNEYS

UNITED STATES PATENT OFFICE.

AMOS C. TUBBS, OF TRADINGPOST, KANSAS.

RANGE-FINDER.

1,250,717.     Specification of Letters Patent.     Patented Dec. 18, 1917.

Application filed February 14, 1917. Serial No. 148,520.

*To all whom it may concern:*

Be it known that I, AMOS C. TUBBS, a citizen of the United States, and a resident of Tradingpost, in the State of Kansas, have invented a certain new and useful Improvement in Range-Finders, of which the following is a specification.

My invention relates to improvements in range finders, and it consists in the combinations, constructions, and arrangements herein described and claimed.

An object of my invention is to provide a simple device, which may be used with any ordinary telescope, field glass, or other device having means for focusing the same.

An object of my invention is to provide a focusing device which is simple in construction, has few parts and which is therefore not easily liable to get out of order, and which will give the range accurately for any distance to which the telescope can be clearly focused.

A further object of my invention is to provide a range finder operated by the necessary focusing of the device, and which, when the device is in focus, will give the range on a dial carried by the device.

Other objects and advantages will appear in the following specification, and the novel features of the invention will be particularly pointed out in the appended claims.

My invention is illustrated in the accompanying drawing forming a part of this application, and in which:

Figure 1 is a plan view of the device;

Fig. 2 is a bottom plan view of a portion of the device;

Fig. 3 is a section along the line 3—3 of Fig. 1;

Fig. 4 is a perspective view of a pointer and means for actuating the same, and Fig. 5 is a section along the line 5—5 of Fig. 2.

In carrying out my invention, I make use of a telescope of any suitable type having focusing means. Ordinarily the focusing means comprises a thumb screw which may be turned to move an inner tube forwardly or backwardly, so as to bring the object in proper focus.

The range finder is shown applied to a telescope consisting of the relatively fixed main body and a focusing tube or slide, the device being adapted more particularly to such a telescope having simply one slidable member.

Referring then to Fig. 1, the main body portion of the telescope is shown at 1. This is provided with an extension or focusing tube 2, at one end. The body portion 1 is provided with a slot 3, see Fig. 2, preferably on the under side with which a rack 4 carried by the extension 2 registers.

The body portion 1 is provided with brackets 5 in which is pivotally mounted the shaft 6 of a thumb wheel 7. The thumb wheel is provided with a pinion 8 which engages the rack 4 so that when the thumb wheel 7 is turned the extension 2 will be moved into or out of the end of the body portion 1.

The extension 2 carries a pin 9 which enters between two arms 10 carried by a disk 11, see Fig. 4. Secured to the disk is a pointer 12 having a pivoted portion 13. Extending from the body portion 1 and preferably integral therewith, are ears 14 between which is secured a dial plate 15, by means of a set screw 16, see Fig. 5. The pivoted portion 13 of the pointer 12 passes through the dial plate and the ears, as shown in Figs. 2 and 3.

From the foregoing description of the various parts of the device, the operation thereof may be readily understood. The telescope is focused by turning the thumb screw 7 which will move the extension 2 to the proper distance to bring the object into focus. The movement of the extension will cause the movement of the pointer 12 over the scale 17 on the dial plate 15. The scale is calibrated so as to give the distance reading directly when the object is brought into focus. All that is necessary is to sight the telescope on the object, bring it into focus, and read the range directly on the scale.

In focusing the telescope, the section 2 is moved out a distance in inverse proportion to the distance of the object to be sighted. For this reason the graduations 17 on the dial plate 15 are arranged progressively nearer each other, as the distances which they represent, increase. For instance, in sighting an object two miles away, the section 2 is drawn out until the pointer 12 points to "2," when the telescope should be in focus for objects at this distance. If the next object be three miles away, the section 2 is drawn out farther until the pointer 12 points to "3." But the distance between "2" and "3" on the dial is less than the distance between "1" and "2," since as stated above, the farther the object is away, the less the section 2 need be drawn out to bring the object into focus.

The eyes of different people differ, so that it may be necessary to adjust the dial for any particular observer. This may be done by unloosening the set screw 16, moving the dial to the proper position, and then tightening the set screw again.

While the construction and arrangement of the device as illustrated in the accompanying drawing is that of a generally preferred form, obviously modifications and changes may be made without departing from the spirit of the invention or the scope of the claims.

I claim:

1. In a range finder for a telescope including a body portion and a sliding extension, a dial carried by the body portion, a pointer playing over the dial having connection with and actuated by the movement of the sliding extension, and means for adjusting the dial with respect to the pointer to compensate for differences in eyesight of observers.

2. In a range finder for telescopes, a dial secured to the body portion of the telescope, a pointer pivotally mounted to play over the dial, a bifurcated arm carried by the pointer, means carried by the focusing tube of the telescope movable in the bifurcated arm for moving the latter, and means for moving said focusing tube and simultaneously shifting the pointer.

3. In a range finder for a telescope, including a body portion having bearing members and a sliding extension, a dial supported between the bearing members, a pointer playing over the dial and having a pivot portion revoluble in the bearing members, and an arm partly encircling the telescope, rack and pinion devices for moving the sliding extension with respect to the body portion, and a free connection between said extension and the pointer arm for revolving the pivot portion as said extension is moved.

4. A focusing device for telescopes comprising a dial secured to the body portion of the telescope, a pointer pivotally mounted to play over the said dial, a pair of arms secured to the pivot of the pointer, a pin carried by the focusing tube and disposed between said arms, the body portion of the telescope having a slot, a rack portion carried by the focusing tube in register with the slot, bearings carried by the body portion of the telescope, a shaft rotatably mounted in said bearings, a thumb wheel at one end of said shaft, and a pinion carried by the shaft and arranged to engage the rack.

AMOS C. TUBBS.

Witnesses:
W. H. NIPHON,
E. L. TUBBS.

Copies of this patent may be obtained for five cents each, by addressing the "Commissioner of Patents, Washington, D. C."